(12) United States Patent
Winchell (10) Patent No.: US 8,107,938 B2
(45) Date of Patent: Jan. 31, 2012

(54) SYSTEM AND METHOD FOR ESTABLISHING COMMUNICATION BETWEEN WIRELESS DEVICES

(75) Inventor: Diane M. Winchell, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1528 days.

(21) Appl. No.: 11/361,156

(22) Filed: Feb. 24, 2006

(65) Prior Publication Data

US 2007/0202863 A1 Aug. 30, 2007

(51) Int. Cl.
*H04M 3/00* (2006.01)
*H04W 4/00* (2009.01)

(52) U.S. Cl. ...................................... 455/418; 455/466

(58) Field of Classification Search .......... 455/418–420, 455/410–411, 500, 458, 517–519, 425, 557, 455/41.2, 466, 412.1–412.2, 414.1, 414.3, 455/423, 556.2; 707/10; 709/217–218, 220; 370/338, 328, 312
See application file for complete search history.

(56) References Cited

U.S. PATENT DOCUMENTS

| | | | | |
|---|---|---|---|---|
| 6,539,220 B1 * | 3/2003 | Sakai et al. | ................... | 455/420 |
| 6,928,151 B2 * | 8/2005 | Yamada et al. | ................ | 379/188 |
| 7,089,313 B2 * | 8/2006 | Lee et al. | ....................... | 709/227 |
| 7,139,551 B2 * | 11/2006 | Jamadagni | .................. | 455/412.1 |
| 7,188,086 B2 * | 3/2007 | Shinzaki et al. | ................ | 705/51 |
| 7,305,438 B2 * | 12/2007 | Christensen et al. | ......... | 709/205 |
| 7,433,982 B2 * | 10/2008 | Peev et al. | ....................... | 710/72 |
| 7,634,260 B2 * | 12/2009 | Chun | .............................. | 455/418 |
| 7,660,987 B2 * | 2/2010 | Baylis et al. | .................. | 713/168 |
| 2002/0103003 A1* | 8/2002 | Mauro, II | ...................... | 455/552 |
| 2004/0073901 A1* | 4/2004 | Imamatsu | ..................... | 717/170 |
| 2004/0142708 A1* | 7/2004 | Asada et al. | ................... | 455/466 |
| 2004/0192274 A1* | 9/2004 | Vuori | ............................... | 455/418 |
| 2004/0203693 A1* | 10/2004 | Mehta et al. | ................... | 455/419 |
| 2005/0022178 A1* | 1/2005 | Ghafoor et al. | ............... | 717/171 |
| 2005/0076057 A1* | 4/2005 | Sharma et al. | ............. | 707/104.1 |
| 2005/0222961 A1* | 10/2005 | Staib et al. | ....................... | 705/64 |
| 2006/0002340 A1* | 1/2006 | Criss et al. | ..................... | 370/328 |
| 2006/0129646 A1* | 6/2006 | Rhee et al. | ..................... | 709/206 |
| 2006/0166739 A1* | 7/2006 | Lin | ................................. | 463/39 |
| 2007/0124459 A1* | 5/2007 | Kasama | ........................ | 709/224 |

FOREIGN PATENT DOCUMENTS

| EP | 1347623 A1 | * | 9/2003 |
|---|---|---|---|
| GB | 2410150 A | * | 7/2005 |

* cited by examiner

*Primary Examiner* — Brandon Miller
(74) *Attorney, Agent, or Firm* — Robert J. O'Connell; James T. Hagler (57) ABSTRACT

A method of communication is disclosed and includes attempting to establish a connection with a destination wireless device. The method also includes determining that the destination wireless device does not include required software. Additionally, the method includes transmitting an indication to the destination wireless device that required software is necessary to establish the connection. Further, the method includes transmitting an indication to the destination wireless device that the originating wireless device is authorized with respect to a one-time download of the required software. The method also includes transmitting a request to a download server to download the required software to the destination wireless device.

11 Claims, 8 Drawing Sheets

SYSTEM AND METHOD FOR ESTABLISHING COMMUNICATION BETWEEN WIRELESS DEVICES

BACKGROUND

I. Field

The present disclosure generally relates to wireless devices. More particularly, the disclosure relates to establishing communication between wireless devices.

II. Description of Related Art

Advances in technology have resulted in smaller and more powerful wireless devices. For example, there currently exist a variety of wireless devices, including mobile phones, personal digital assistants (PDAs), laptops, and paging devices that are small, lightweight, and easily carried by users. These devices may include the ability to transmit voice and/or data over wireless networks. Further, many such wireless devices provide significant computing capabilities, and as such, are becoming tantamount to small personal computers and handheld PDAs.

Typically, these smaller and more powerful wireless devices are often resource constrained. For example, the screen size, the amount of available memory and file system space, and the amount of input and output capabilities may be limited by the small size of the device. Because of such severe resource constraints, it is can be desirable to maintain a limited size and quantity of software applications and other information residing on such wireless devices.

Some of these wireless devices utilize application programming interfaces (APIs) that are sometimes referred to as runtime environments and software platforms. The APIs can be installed onto a wireless device to simplify the operation and programming of such wireless devices by providing generalized calls for device resources. Further, some APIs can provide software developers the ability to create software applications that are executable on such wireless devices. In addition, APIs can provide an interface between a wireless device system hardware and the software applications. As such, the wireless device functionality can be made available to the software applications by allowing the software to make a generic call for a function thus not requiring the developer to tailor its source code to the individual hardware or device on which the software is executing. Further, some APIs can provide mechanisms for secure communications between wireless devices, such as client devices and server systems, using secure cryptographic key information.

Examples of such APIs, some of which are, discussed in more detail below, include those currently publicly available versions of the Binary Runtime Environment for Wireless® (BREW®) platform, developed by Qualcomm, Inc. of San Diego, Calif. The BREW® platform can provide one or more interfaces to particular hardware and software features found on wireless devices.

Further, the BREW® platform can be used in an end-to-end software distribution system to provide a variety of benefits for wireless service operators, software developers and wireless device manufacturers and consumers. One such currently available end-to-end software distribution system, called the BREW® solution developed by QUALCOMM Incorporated, includes logic distributed over a server-client architecture, wherein the server can perform billing, security, and application distribution functionality, and wherein the client can perform application execution, security and user interface functionality.

In certain cases, secure applications can be required to establish communication between a calling wireless device and a called wireless device. If the called wireless device does not include the secure application, communication with the calling wireless device may be prevented.

Accordingly it would be advantageous to provide an improved system and method of establishing communication between wireless devices.

SUMMARY

A method of communication is disclosed and includes attempting to establish a connection with a destination wireless device. The method also includes determining that the destination wireless device does not include required software. Additionally, the method includes transmitting an indication to the destination wireless device that required software is necessary to establish the connection.

In a particular embodiment, the method includes transmitting an indication to the destination wireless device that the originating wireless device is authorized with respect to a one-time download of the required software. In yet another particular embodiment, the method includes transmitting a request to a download server to download the required software to the destination wireless device. In still another particular embodiment, the method includes receiving a response from the download server indicating that the required software was downloaded to the destination wireless device. Additionally, in a particular embodiment, the method includes establishing a connection with the destination wireless device using the required software.

In yet still another particular embodiment, the method includes receiving a response from the download server indicating the required software was not downloaded to the destination wireless device. Further, in a particular embodiment, the method includes transmitting an indication to the destination wireless device that an attempted connection has been aborted.

In a particular embodiment, the required software is a security application that includes a decoder and an encoder. In another particular embodiment, the required software is a gaming application that allows two or more users to compete via wireless devices.

In another embodiment, a method of communication is disclosed and includes receiving a call at a destination wireless device from an originating wireless device. Further, the method includes determining that required software is needed to establish a connection with the originating wireless device. Additionally, the method includes indicating to the originating wireless device that the required software is not present at the destination wireless device.

In yet another embodiment, a method of downloading software is provided and includes receiving an indication from an originating wireless device to provide required software to a destination wireless device. Also, in this embodiment, the method includes transmitting an indication to the destination wireless device that the required software can be downloaded upon approval of the destination wireless device.

In still another embodiment, a communication system is disclosed and includes an originating wireless device and a download server coupled to the originating wireless device. In this embodiment, the download server includes a processor, a computer readable medium that is accessible to the processor, and a computer program that is embedded within the computer readable medium. Additionally, in this embodiment, the computer program includes instructions to receive a request from an originating wireless device to provide required software to a destination wireless device and instructions to download the required software to the destination wireless device.

In yet still another embodiment, a wireless device is disclosed and includes a processor and a computer readable medium that is accessible to the processor. A computer program can be embedded within the computer readable medium. In this embodiment, the computer program includes instructions to establish a connection with a destination wireless device, instructions to determine that the destination wireless device does not include required software, and instructions to authorize a one-time use download of the required software.

In another embodiment, a wireless device is disclosed and includes a processor and a computer readable medium that is accessible to the processor. Further, a computer program can be embedded within the computer readable medium. In this embodiment, the computer program includes instructions to receive a call from an originating wireless device, instructions to determine that required software is needed to communicate with the originating wireless device, instructions to indicate that the required software is not present, and instructions to receive the required software from a download server.

In still another embodiment, a graphical user interface for a wireless device is disclosed and includes a text message. In this embodiment, the text message indicates that a call is unable to connect. Also, the text message indicates that a destination device requires additional software. Additionally, the text message includes a query to authorize a download to the destination telephone.

In yet another embodiment, a graphical user interface for a wireless device is disclosed and includes a text message that can indicate that special software is required to establish a connection. The text message can further indicate that an originating device has authorized a download of the special software. Moreover, the text message can include a query to download the special software.

In another embodiment, a wireless device is disclosed and includes means for attempting to establish a connection with a destination wireless device, means for determining that the destination wireless device does not include required software, and means for transmitting an indication to the destination wireless device that required software is necessary to establish the connection.

In still another embodiment, a wireless device is disclosed and includes means for receiving a call at a destination wireless device from an originating wireless device, means for determining that required software is needed to establish a connection with the originating wireless device, and means for indicating to the originating wireless device that the required software is not present at the destination wireless device.

In yet another embodiment, a download server is disclosed and includes means for receiving an indication from an originating wireless device to provide required software to a destination wireless device, and means for transmitting an indication to the destination wireless device that the required software can be downloaded upon approval of the destination wireless device.

An advantage of one or more of embodiments disclosed herein can include providing a way for an originating wireless device to authorize a download of required software to a destination wireless device.

Another advantage can include allowing an originating wireless device to authorize the download of required software to a destination wireless device for a one time only use.

Still another advantage can include allowing a user of an originating wireless device to pay for the download of required software to a destination wireless device.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

The word "exemplary" is used herein to mean "serving as an example, instance, or illustration." Any embodiment described herein as "exemplary" is not necessarily to be construed as preferred or advantageous over other embodiments. Further, many embodiments are described in terms of sequences of actions to be performed by, for example, elements of a wireless device. It will be recognized that various actions described herein could be performed by specific circuits, e.g., application specific integrated circuits (ASICs), by program instructions being executed by one or more processors, or by a combination of both.

Further, the embodiments described herein can additionally be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform a certain action or "code operable to" perform the described action. The following detailed description describes methods, systems, software and apparatus used in connection with one or more wireless devices.

In one or more embodiments, a wireless device may utilize a runtime environment, such as a version of the Binary Runtime Environment for Wireless® (BREW®) software platform developed by QUALCOMM, Inc., of San Diego, Calif.

In at least one embodiment in the following description, the system used to provide communications between wireless devices and servers is implemented on a wireless device executing a runtime environment, such as the current version of the BREW® software platform. However, one or more embodiments of the system used to provide communications between wireless devices and servers are suitable for use with other types of runtime environments that, for example, operate to control the execution of applications on wireless devices.

Figure 1:
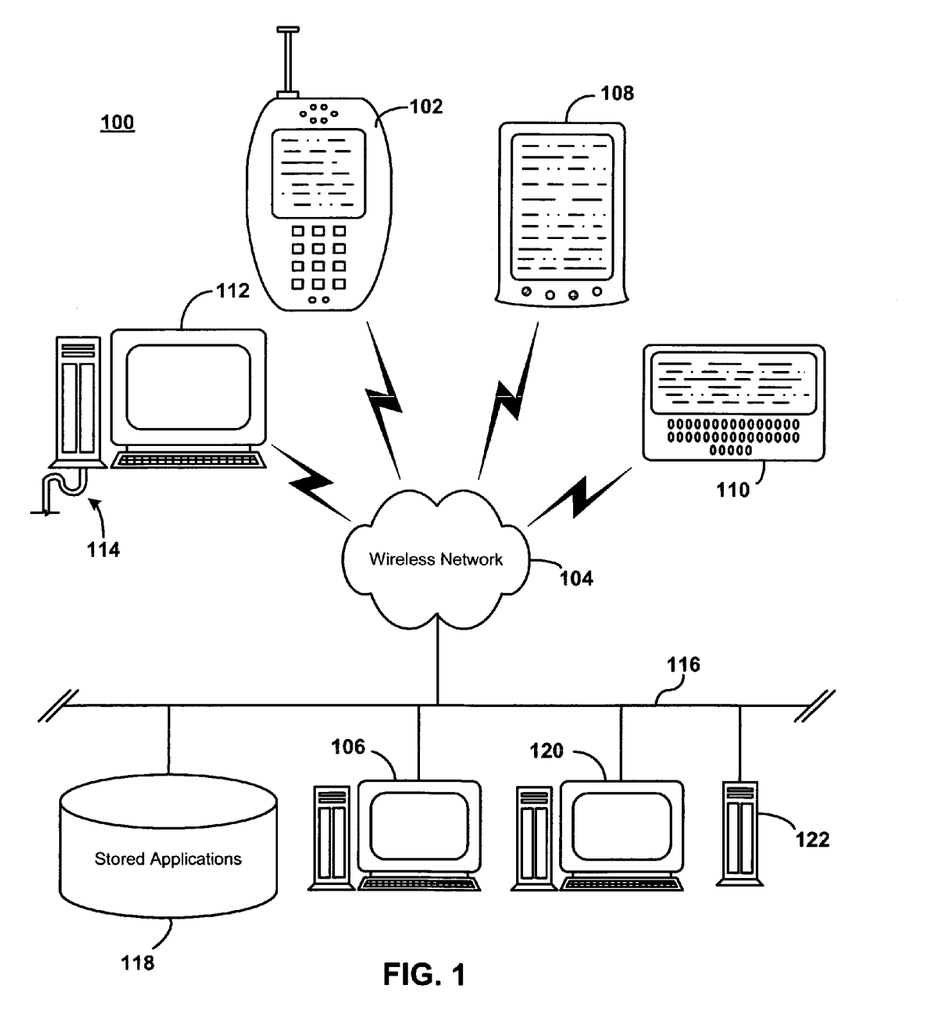
FIG. 1 is a general diagram of a particular embodiment of a system providing communications between a wireless device and a server.

FIG. 1 illustrates a block diagram of an exemplary, non-limiting embodiment of a system 100 that may perform loading, reloading, and deletion of software application components on a wireless device, such as wireless telephone 102. The wireless telephone 102 communicates across a wireless network 104 with at least one application server 106. Further, the application server 106 can selectively transmit one or more software applications and components to one or more wireless devices across a wireless communication portal or other node having data access to the wireless network 104.

As illustrated in FIG. 1, the wireless device can be a wireless telephone 102, a personal digital assistant 108, a pager 110, or a separate computer platform 112 that has a wireless communication portal. In a particular embodiment, the pager 110 can be a two-way text pager. Further, in an alternative embodiment, the wireless device can have a wired connection 114 to a network or the Internet. The exemplary, non-limiting system can include any form of a remote module including a wireless communication portal, including without limitation, wireless modems, PCMCIA cards, personal computers, access terminals, telephones with or without a display or keypad, or any combination or sub-combination thereof.

As depicted in FIG. 1, the application download server 106 is coupled to a network 116 with other computer elements in communication with the wireless network 104. The system 100 includes a second server 120 and a stand-alone server 122, and each server can provide separate services and processes to the wireless devices 102, 108, 110, 112 across the wireless network 104. Further, as indicated in FIG. 1, the system 100 also includes at least one stored application database 118 that stores software applications that are downloadable by the wireless devices 102, 108, 110, 112. Different embodiments are contemplated that locate logic to perform secure communications at any one or more of the application download server 106, the second server 120 and the stand-alone server 122.

Figure 2:
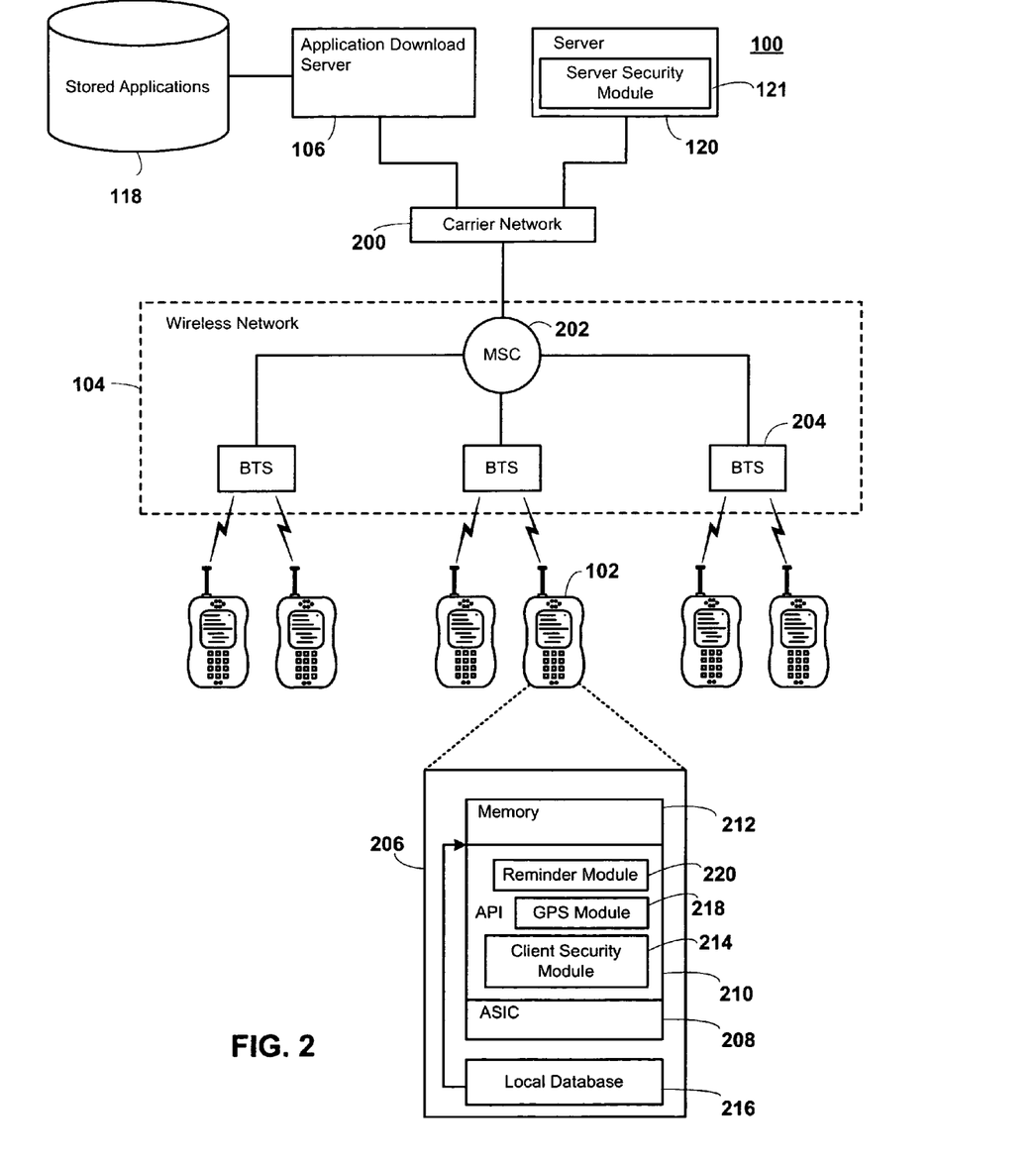
FIG. 2 is a general diagram that illustrates further details of the particular embodiment of the system of FIG. 1.

In FIG. 2, a block diagram is shown that more fully illustrates the system 100, including the components of the wireless network 104 and interrelation of the elements of the system 100. The system 100 is merely exemplary and can include any system whereby remote modules, such as the wireless devices 102, 108, 110, 112 communicate over-the-air between and among each other and/or between and among components connected via a wireless network 104, including, without limitation, wireless network carriers and/or servers. The application download server 106 and the stored application database 118, along with any other servers, such as server 120, are compatible with wireless communication services and can communicate with a carrier network 200 through a data link, such as the Internet, a secure LAN, WAN, or other network. In an illustrative embodiment, the server 120 contains a server security module 121 that further contains logic configured to provide for secure communications over the carrier network 200. In a particular embodiment, the server security module 121 can operate in conjunction with a client security module located on a wireless device, such as wireless devices 102, 108, 110, 112, to provide secure communications.

The carrier network 200 controls messages (sent as data packets) sent to a mobile switching center ("MSC") 202. The carrier network 200 communicates with the MSC 202 by a network, such as the Internet and/or POTS ("plain ordinary telephone system"). Typically, the network connection between the carrier network 200 and the MSC 202 transfers data, and the POTS network transfers voice information. The MSC 202 is connected to multiple base transceiver stations ("BTS") 204. The MSC 202 can be connected to the BTS 204 by both a data network for data transfer and POTS for voice information. The BTS 204 ultimately broadcasts messages wirelessly to the wireless devices, such as to wireless telephone 102, by the short messaging service ("SMS"), or other over-the-air methods known in the art.

The wireless device 102 has a computer platform 206 that can receive and execute software applications transmitted from the application download server 106. The computer platform 206 may be implemented as an application-specific integrated circuit ("ASIC" 208), a processor, microprocessor, logic circuit, or other data processing device. The ASIC 208 is installed at the time of manufacture of the wireless device. The ASIC 208 or other processor can execute an application programming interface ("API") 210 layer that interfaces with resident programs in the memory 212 of the wireless device. The memory 212 can be comprised of read-only or random-access memory (ROM or RAM), EEPROM, flash memory, or any other memory suitable for computer platforms.

The API 210 also includes a client security module 214 containing logic configured to provide for secure communications over the carrier network 200. In a particular embodiment, the client security module 214 can operate in conjunction with the server security module 121 to provide secure communications. As illustrated in FIG. 2, the computer platform 206 can further include a local database 216 that can hold applications not actively used in memory 212. In an illustrative embodiment, the local database 216 is stored within a flash memory cell, but it can be stored within any secondary storage device as known in the art, such as magnetic media, EEPROM, optical media, tape, or floppy or hard disk.

A wireless device, e.g., the wireless telephone 102, can download one or more software applications, such as games, news, stock monitors, and the like, from the application download server 106. Further, the wireless device can store the downloaded applications in the local database 216, when not in use, and can load stored resident applications from the local database 216 to memory 212 for execution by the API 210 when desired by the user. Further, communications over the wireless network 104 may be performed in a secure manner, at least in part, due to the interaction and operation of the client security module 214 and the server security module 121. As shown in FIG. 2, the API 210 can also include a global positioning system (GPS) module 218 and a reminder module 220.

Figure 3:
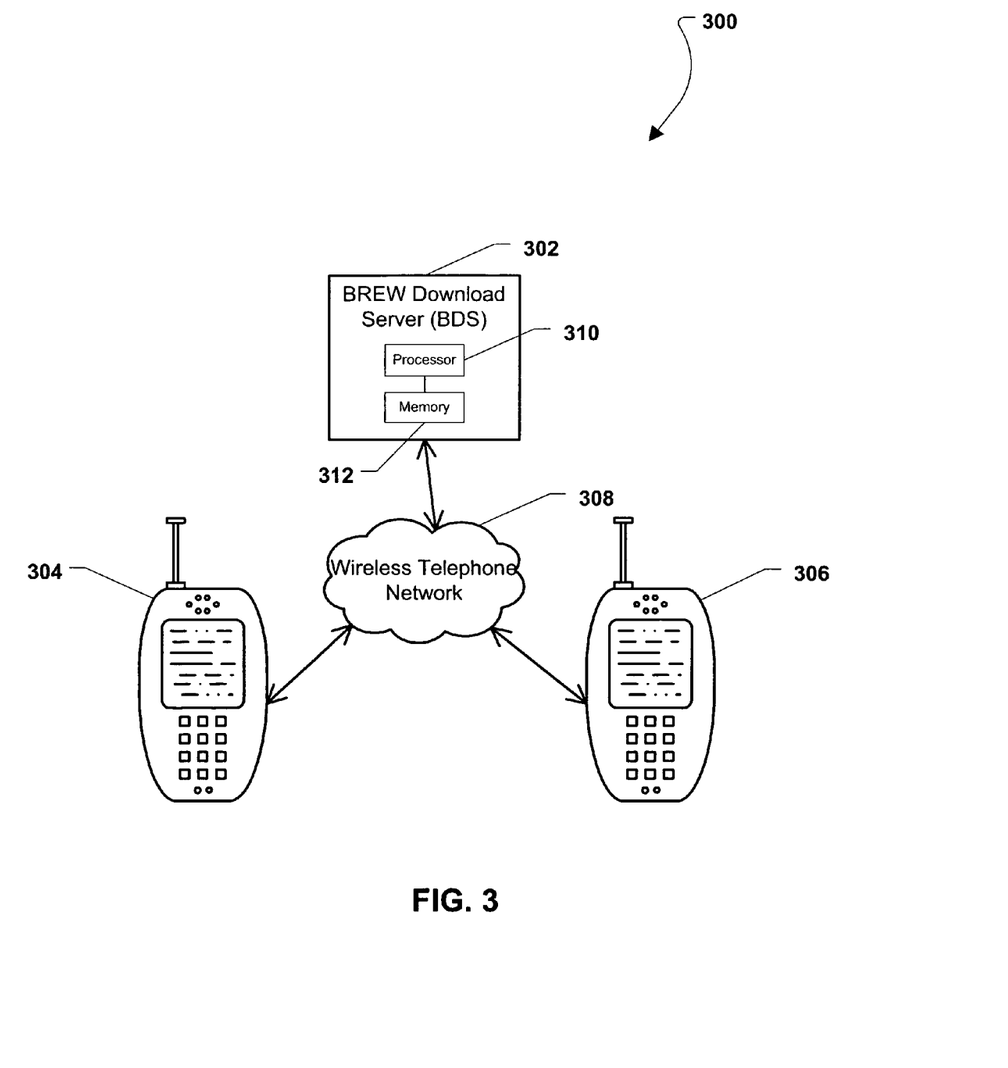
FIG. 3 is a general diagram of a system of downloading applications to wireless devices.

FIG. 3 depicts a system, designated 300, that can be used to download one or more applications to a wireless device. As illustrated, the system 300 includes a download server 302, e.g., a BREW download server. Additionally, as shown in FIG. 3, a first wireless device 304 and a second wireless device 306 can communicate with the download server and each other via a wireless telephone network 308. In a particular embodiment, the first wireless device 304 is an originating wireless device and the second wireless device 306 is a destination wireless device. Moreover, the first wireless device 304 and the second wireless device 306 can be a wireless telephone, a lap top, a desktop computer, a handheld computer, a portable digital assistant (PDA), or any other electronic device that is configured to communicate via wireless connection or a wired connection.

Figure 4:
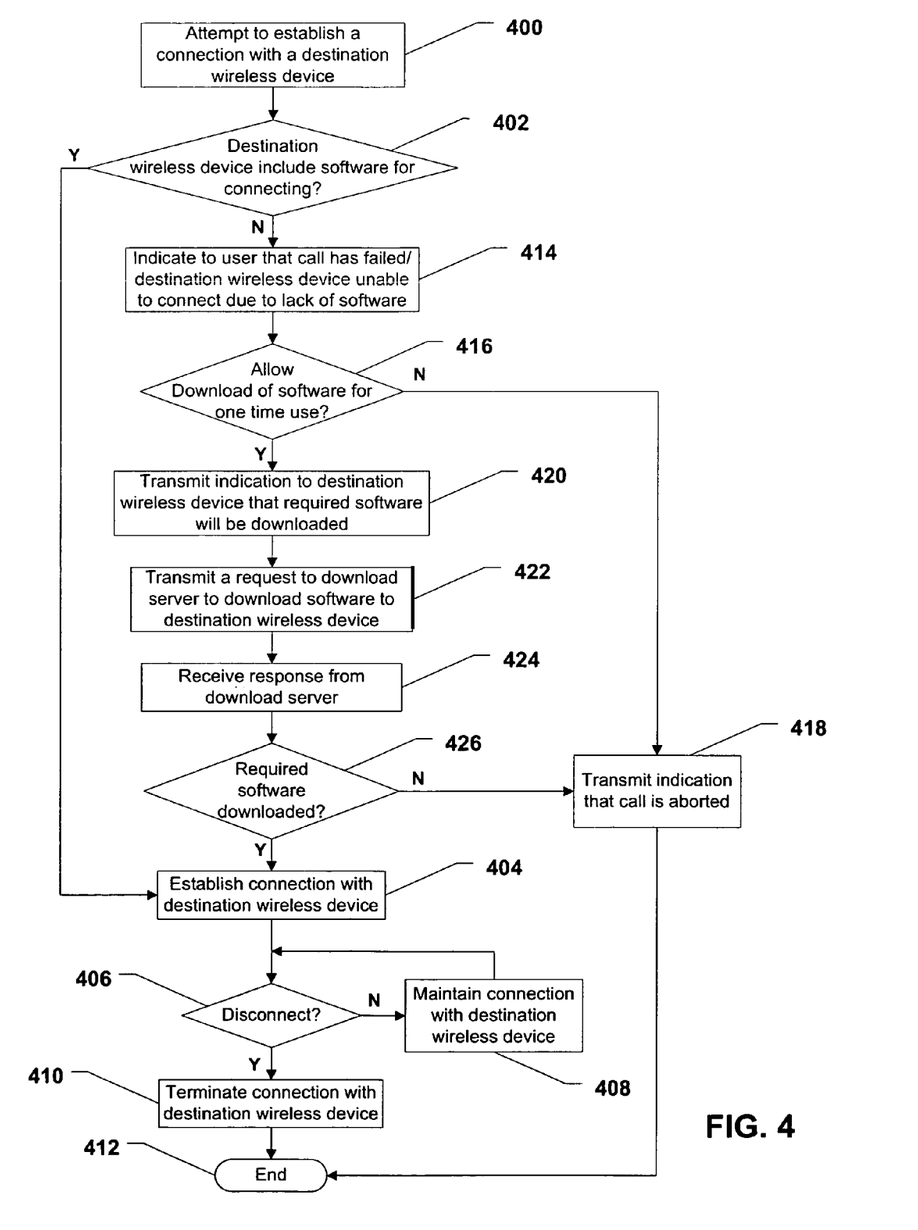
FIG. 4 is a flow chart illustrating a method of establishing communication between an originating wireless device and a destination wireless device.
Figure 5:
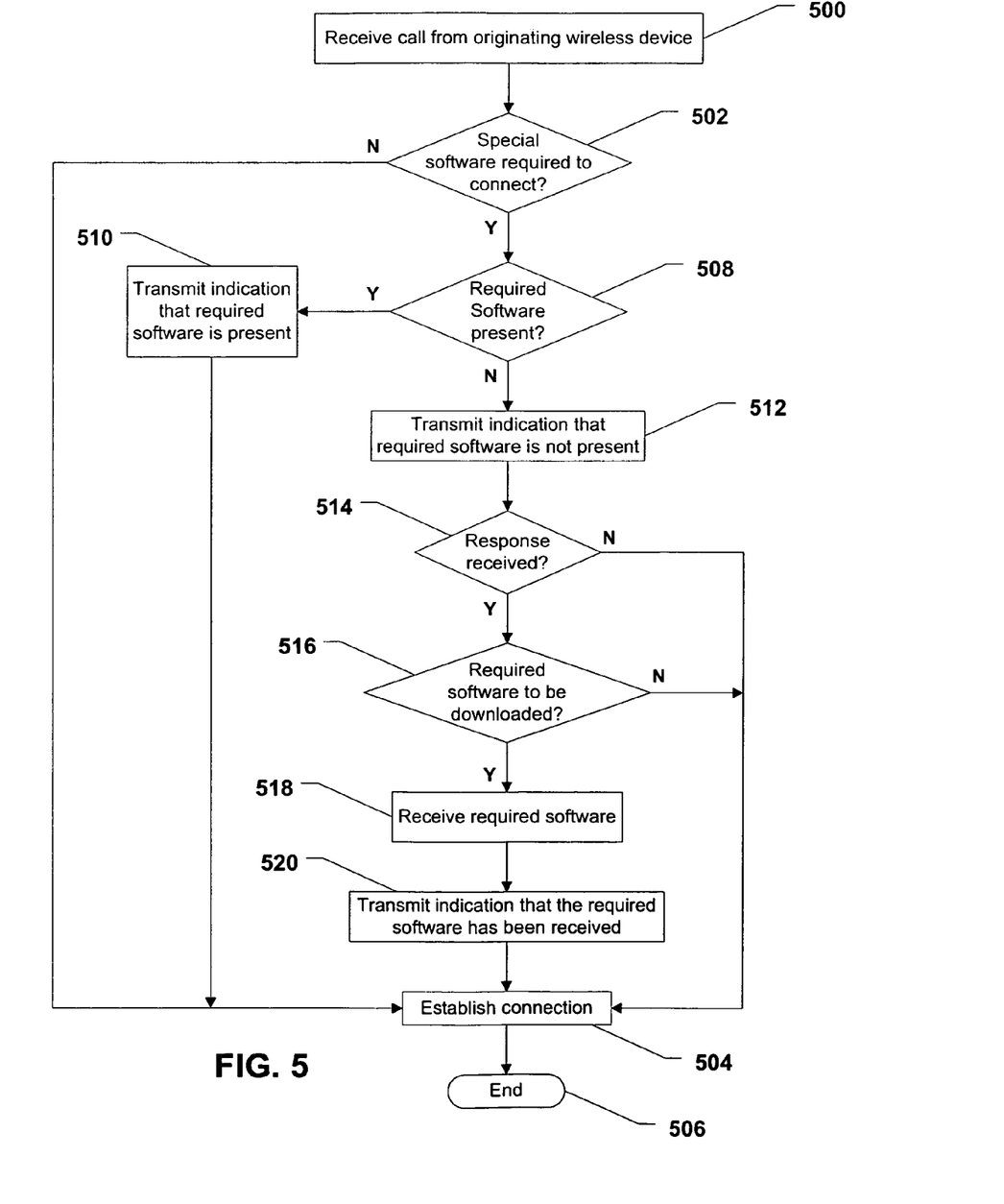
FIG. 5 is a flow chart illustrating an alternative method of establishing communication between an originating wireless device and a destination wireless device.
Figure 6:
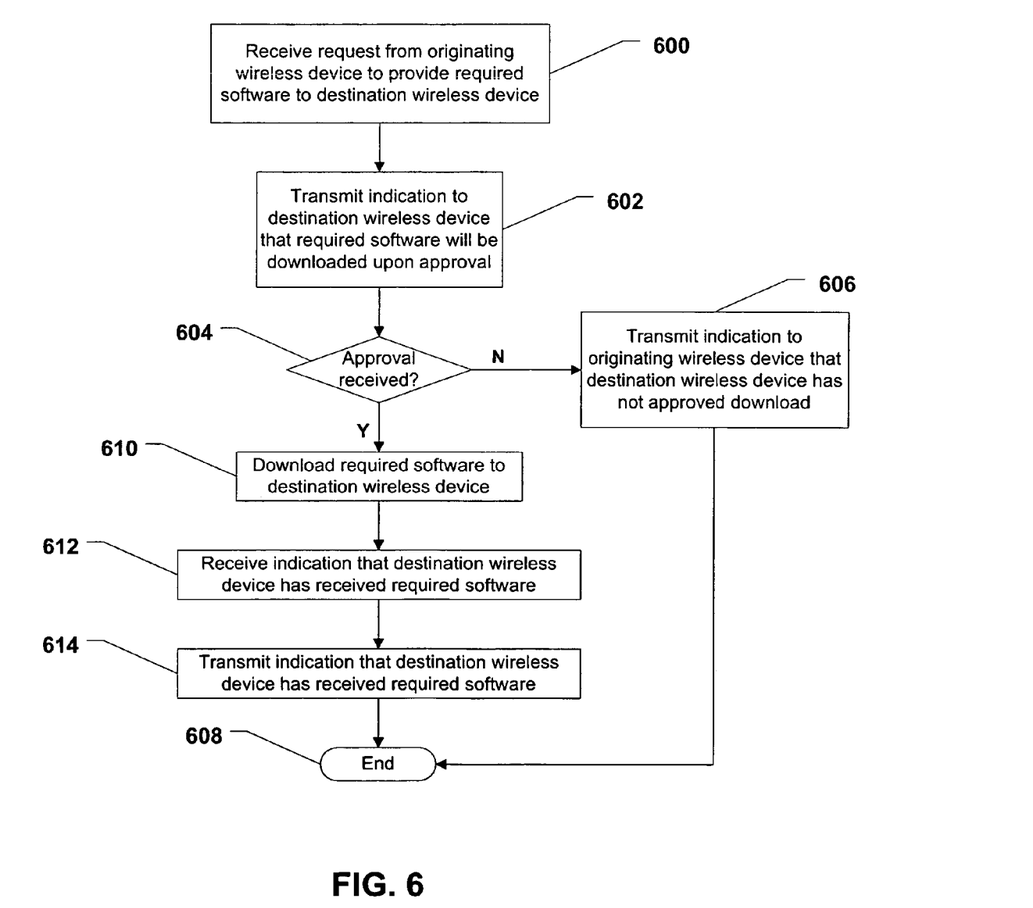
FIG. 6 is a flow chart illustrating a method of downloading software to a destination device.

As illustrated in FIG. 3, the download server 302 can include a processor 310 and a computer readable medium 312, e.g., a memory, that is accessible to the processor 312. In a particular embodiment, a computer program is embedded within the computer readable medium 312 and can be used to control the downloads of applications to one or more of the wireless devices 306, 308. More particularly, when an originating wireless device 304 requests the download of a required application to a destination wireless device 306, the download server 302 can transmit a message to the destination wireless device 306 to indicate that the originating wireless device is requesting that required software be downloaded thereto. Also, the download server 302 can request that the destination wireless device 306, or a user thereof, allow the download of the require application. FIGS. 4 through 6, described in detail below, illustrate exemplary, non-limiting methods that can be used to control the download of required applications to destination wireless devices.

FIG. 4 illustrates a method of establishing communication between an originating wireless device and a destination wireless device. Commencing at block 400, the originating wireless device attempts to establish a connection with the destination wireless device. At decision step 402, the originating wireless device determines whether the destination wireless device includes software that is required to connect and communicate with the originating wireless device. If so, the method proceeds to block 404 and the originating wireless device establishes a connection with the destination wireless device.

Moving to decision step 406, the originating wireless device determines whether the user has decided to disconnect with the destination wireless device. If not, the method continues to block 408 and the originating wireless device maintains the connection with destination wireless device. Otherwise, the method proceeds to block 410 and the originating device terminates the connection with destination wireless device. The method then ends at state 412.

Returning to decision step 402, if the destination wireless device does not include the required software, the method moves to block 414. At block 414, the originating wireless device presents an indication to the user that the call has failed, e.g., that the call cannot be connected unless required software is downloaded to the destination device. In a particular embodiment, the required software can be security software, e.g., software that requires an encoder and a decoder in order to facilitate communication between two wireless devices. In another embodiment, the required software can be gaming software that will facilitate competition between the users of two or more wireless devices.

Proceeding to decision step 416, the originating wireless device queries the user as to whether he or she will allow a download of the required software for a one time use. In a particular embodiment, the user of the originating wireless device can also agree to pay for the download—if necessary. If the user does not authorize download of the required software, the method continues to block 418 and the originating device transmits an indication that the call is aborted. The method then ends at state 412.

Returning to decision step 416, if the user authorizes download of the required software, the method proceeds to block 420 and the originating wireless device transmits an indication to the destination wireless device that the required software will be downloaded from a download server. Continuing to block 422, the originating device transmits a request to the download server to download the required software to the destination wireless device. At block 424, the originating wireless device receives a response from download server.

Moving to decision step 426, the originating wireless device determines whether the required software has been downloaded to the destination device. If not, the method proceeds to block 418 and the method continues as described herein. On the other hand, if the required software has been downloaded, the method proceeds to block 404 and the originating wireless device establishes a connection with the destination wireless device using the required software. The method then continues as described herein.

Referring to FIG. 5, a method of establishing communication between an originating wireless device and a destination wireless device is shown and commences at block 500. At block 500, the destination wireless device receives a call from an originating wireless device. Moving to decision step 502, the destination wireless device determines whether special software is required to connect and communicate with the originating wireless device. If not, the method proceeds to block 504 and the destination wireless device establishes a connection with the originating wireless device. The method then ends at state 506.

Returning to decision step 502, if special software is required, the method moves to decision step 508 and the destination wireless device determines whether the required software is present at the destination wireless device. If so, the method moves to block 510 and the destination wireless device transmits an indication to the originating wireless device that the required software is present. The method then proceeds to block 504 and continues as described herein.

Returning to decision step 508, if the required software is not present, the method moves to block 512 and the destination wireless device transmits an indication to the originating wireless device that the required software is not present. Next, at decision step 514, the destination wireless device determines whether a response is received from the originating wireless device. If no response is received, the method ends at state 506. If a response is received from the originating wireless device, the method continues to decision step 516 and the destination wireless device determines whether the required software is to be downloaded thereto. If not, the method ends at state 506.

On the other hand, if the required software is to be downloaded, the method proceeds to block 518 and the required software is received from a download server or optionally, from another source, such as from the originating device. Then, at block 520, the destination wireless device transmits an indication to the originating wireless device that the required software has been received. Moving to block 504, the destination wireless device establishes a connection with the originating wireless device and the destination device can execute the downloaded software. The method then ends at state 506.

FIG. 6 depicts a method of downloading software to a destination device. Beginning at block 600, a download server receives a request from an originating wireless device to provide software to a destination wireless device. In a particular embodiment, the software is required to allow the destination wireless device to connect and communicate with the originating wireless device. For example, the required software can be a security application that requires an encoder to transmit a signal to the originating wireless device and a decoder to receive a signal from the originating wireless device. At block 602, the download server transmits an indication to the destination wireless device that the required software will be downloaded to the destination wireless device upon receiving approval from the destination wireless device.

Moving to decision step 604, the download server determines whether approval is received. If approval is not received from the destination wireless device, the method moves to block 606 and the download server transmits an indication to the originating wireless device that the destination wireless device has not approved download of the required software. The method then ends at state 608.

Returning to decision step 604, if approval from the destination wireless device is received at the download server, the method proceeds to block 610 and the download server downloads the required software to the destination wireless device. Thereafter, at block 612, the download server receives an indication from the destination wireless device that the required software has been completely downloaded. Continuing to block 614, the download server transmits an indication to the originating wireless device that the destination wireless device has received the required software. The method then ends at state 608.

Figure 7:
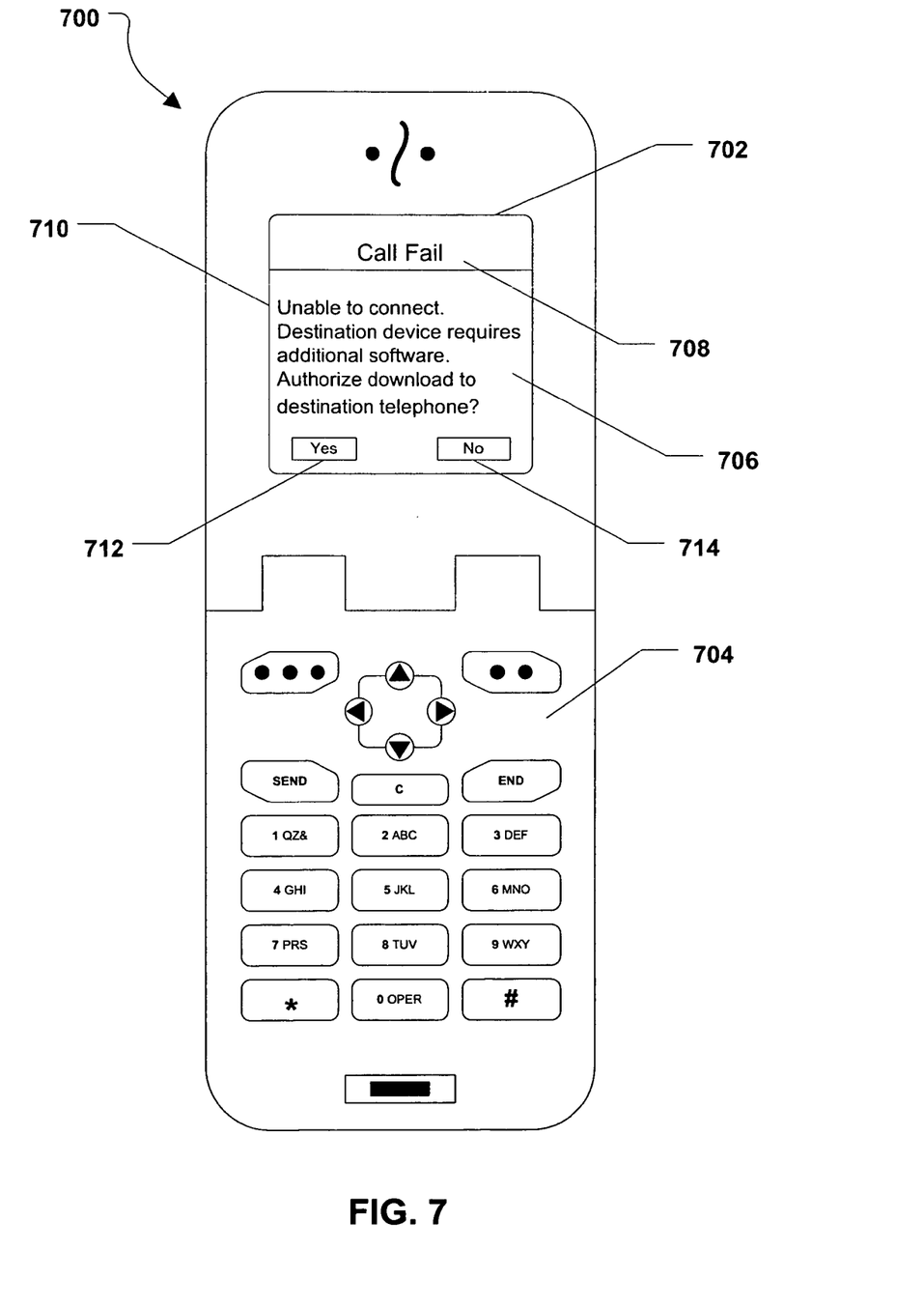
FIG. 7 is a diagram of a wireless device showing an originating wireless device graphical user interface.

Referring to FIG. 7, an originating wireless device is shown and is generally designated 700. As shown, the originating wireless device 700 includes a display 702 and a keypad 704. FIG. 7 further illustrates an originating wireless device graphical user interface (GUI) 706 that can be presented to a user via the display 702 of the wireless device 700. As shown, the originating wireless device GUI 706 can include a screen header 708 and a text message 710. In a particular embodiment, the text message 710 can state, "Unable to connect. Destination device requires additional software. Authorize download to destination telephone?" In an illustrative embodiment, the user of the originating wireless can choose whether or not to authorize the download to the destination wireless device by selecting the yes soft button 712 or the no soft button 714.

Figure 8:
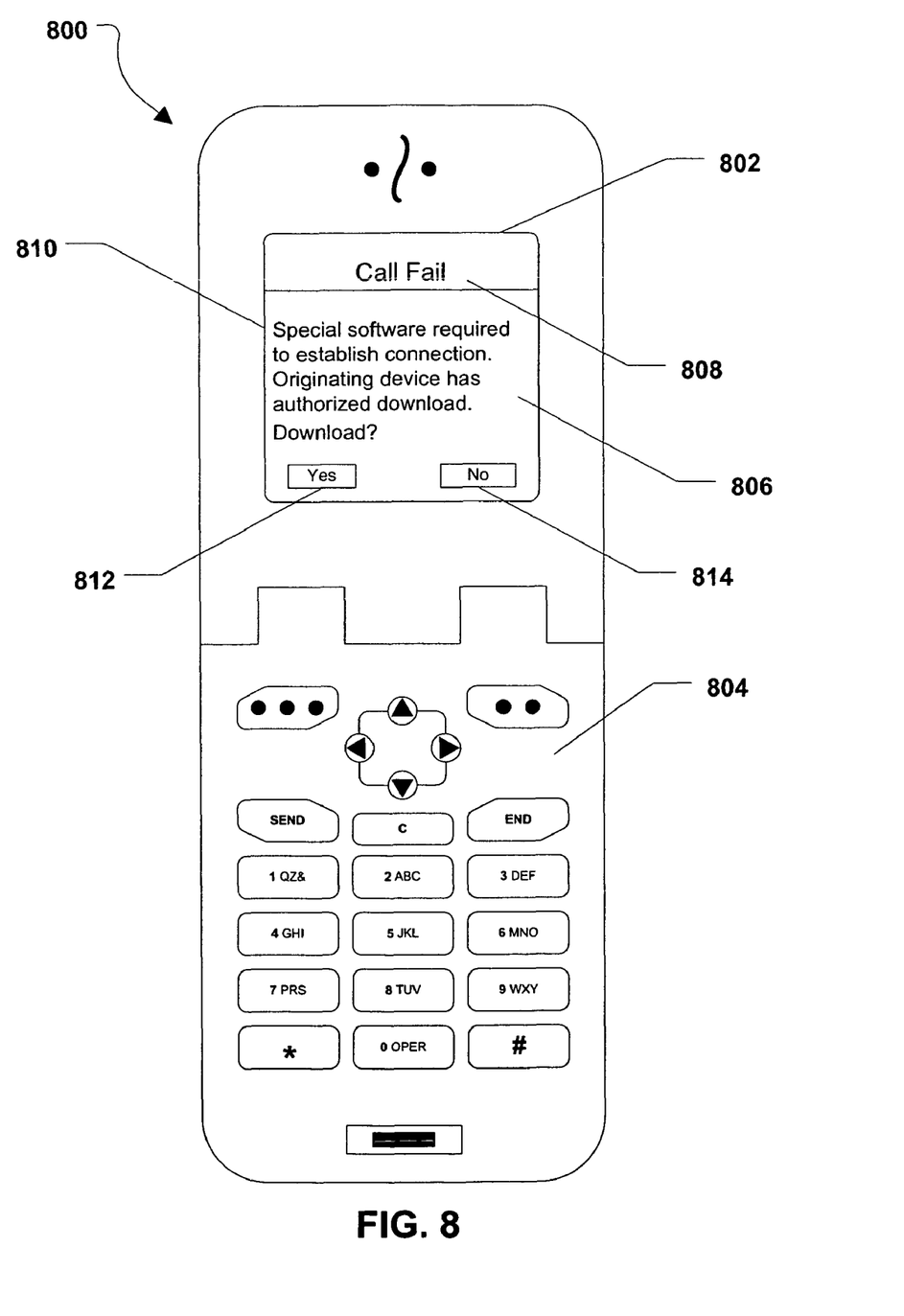
FIG. 8 is a diagram of a wireless device showing a destination wireless device graphical user interface.

FIG. 8 illustrates a destination wireless device, generally designated 800. As shown, the wireless device 800 includes a display 802 and a keypad 804. FIG. 8 further illustrates a destination wireless device graphical user interface (GUI) 806 that can be presented to a user via the display 802 of the destination wireless device 800. As shown, the destination wireless device GUI 806 can include a screen header 808 and a text message 810. In a particular embodiment, the text message 810 can state, "Special software required to establish connection. Originating device has authorized download. Download?" In an illustrative embodiment, the user of the destination wireless device can choose whether or not to allow the download to the destination wireless device by selecting the yes soft button 812 or the no soft button 814.

With the configuration of structure disclosed herein, the system and method can allow a user of an originating wireless device to authorize the download of a required application from a download server to a destination wireless device in order to allow the destination wireless device to communicate with the originating wireless device. In a particular embodiment, the required application can be a security application, e.g., an application that includes a decoder and encoder in order to allow communication between two or more wireless devices. Additionally, in a particular embodiment, the required application can be a game that can allow two or more players at different wireless devices to compete with or against each other.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a wireless device or a user terminal. In the alternative, the processor and the storage medium may reside as discrete components in a wireless device or user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features as defined by the following claims.

What is claimed is:

1. A method of communication executed by an originating wireless device, the method comprising:
    attempting in the originating wireless device to establish a connection with a destination wireless device;
    determining in the originating wireless device that the destination wireless device does not include required software;
    transmitting from the originating wireless device an indication to the destination wireless device that required software is necessary to establish the connection; and
    transmitting from the originating wireless device an indication to the destination wireless device that the originating wireless device is authorized with respect to a one-time download of the required software.

2. The method of claim 1, further comprising transmitting from the originating wireless device a requests to a download server to download the required software to the destination wireless device.

3. The method of claim 2, further comprising receiving in the originating wireless device a response from the download server indicating that the required software was downloaded to the destination wireless device.

4. The method of claim 3, further comprising establishing a connection from the originating wireless device to the destination wireless device using the required software.

5. The method of claim 2, further comprising receiving in the originating wireless device a response from the download server indicating the required software was not downloaded to the destination wireless device.

6. The method of claim 5, further comprising transmitting from the originating wireless device an indication to the destination wireless device that an attempted connection has been aborted.

7. The method of claim 1, wherein the required software is a security application that includes a decoder and an encoder.

8. The method of claim 1, wherein the required software is a gaming application that allows two or more users to compete via wireless devices.

9. An originating wireless device, comprising:
a processor; and
a computer readable medium accessible to the processor and having stored thereon processor-executable software instructions configured to cause the processor to perform operations comprising:
establishing a connection with a destination wireless device;
determining in the originating wireless device that the destination wireless device does not include required software; and
authorizing a one-time use download of the required software to the destination wireless device by the originating wireless device.

10. An originating wireless device, comprising:
means for attempting to establish a connection with a destination wireless device;
means for determining in the originating wireless device that the destination wireless device does not include required software;
means for transmitting from the originating wireless device an indication to the destination wireless device that required software is necessary to establish the connection; and
means for transmitting from the originating wireless device an indication to the destination wireless device that the originating wireless device is authorized with respect to a one-time download of the required software.

11. A method of communication, the method comprising:
attempting to establish a connection with a destination wireless device;
determining at an originating wireless device that the destination wireless device does not include required software;
transmitting an indication to the destination wireless device that required software is necessary to establish the connection;
transmitting an indication to the destination wireless device that the originating wireless device is authorized for a one-time download of the required software;
transmitting a request to a download server to download the required software to the destination wireless device;
receiving a response from the download server indicating the required software was not downloaded to the destination wireless device; and
transmitting an indication to the destination wireless device that an attempted connection has been aborted.

* * * * *